United States Patent
Peck

(10) Patent No.: US 11,848,014 B2
(45) Date of Patent: Dec. 19, 2023

(54) HUMAN-MACHINE INTERFACES AND METHODS WHICH DETERMINE INTENDED RESPONSES BY HUMANS

(71) Applicant: SANCTUARY COGNITIVE SYSTEMS CORPORATION, Vancouver (CA)

(72) Inventor: Holly Marie Peck, Vancouver (CA)

(73) Assignee: Sanctuary Cognitive Systems Corporation, BC (CA)

( * ) Notice: Subject to any disclaimer, the term of this patent is extended or adjusted under 35 U.S.C. 154(b) by 740 days.

(21) Appl. No.: 16/924,879

(22) Filed: Jul. 9, 2020

(65) Prior Publication Data

US 2021/0012772 A1  Jan. 14, 2021

Related U.S. Application Data

(60) Provisional application No. 62/873,093, filed on Jul. 11, 2019.

(51) Int. Cl.
| | |
|---|---|
| *G10L 15/22* | (2006.01) |
| *G06F 16/63* | (2019.01) |
| *G10L 25/63* | (2013.01) |
| *G10L 15/25* | (2013.01) |
| *G10L 15/06* | (2013.01) |
| *G10L 15/16* | (2006.01) |

(52) U.S. Cl.
CPC ............. *G10L 15/22* (2013.01); *G06F 16/63* (2019.01); *G10L 15/16* (2013.01); *G10L 15/25* (2013.01); *G10L 25/63* (2013.01); *G10L 2015/223* (2013.01); *G10L 2015/227* (2013.01)

(58) Field of Classification Search
CPC ......... G06F 16/63; G06V 40/28; G10L 15/16; G10L 15/22; G10L 15/25; G10L 2015/223; G10L 2015/227; G10L 25/63
See application file for complete search history.

(56) References Cited

U.S. PATENT DOCUMENTS

2017/0345420 A1* 11/2017 Barnett, Jr. ......... G10L 15/1815
2019/0043511 A1* 2/2019 Zhang ..................... B25J 9/161

FOREIGN PATENT DOCUMENTS

WO  WO-2016018784 A1 * 2/2016 ............. G06F 3/012

* cited by examiner

*Primary Examiner* — Angela A Armstrong
(74) *Attorney, Agent, or Firm* — Thomas Mahon; Adenike Adebiyi

(57) ABSTRACT

Human-machine interfaces may capture interactions by humans with robots (e.g., robots with a humanoid appearance), the interactions taking a variety of forms (e.g., audio, visual), and may determine an intent of the humans or meaning of human responses via analysis of the interactions. Intent can be determined based on analysis of aural response, including meaning or semantics and/or tone. Intent can be determined based on analysis of visually detectable responses, including head motions, facial gestures, hand or arm gestures, eye gestures. Responses may be compared for consistency. Humans may be queried to confirm determined intended response.

23 Claims, 10 Drawing Sheets

HUMAN-MACHINE INTERFACES AND METHODS WHICH DETERMINE INTENDED RESPONSES BY HUMANS

TECHNICAL FIELD

This description generally relates to human-machine interfaces, for example human-machine interfaces that capture interactions by humans with robots, the interactions taking a variety of forms (e.g., audio, visual), and which determines an intent of the humans or meaning of human responses via analysis of the interactions.

DESCRIPTION OF THE RELATED ART

Robots come in a wide variety of forms. For example, some robots include movable appendages, typically with an end-of-arm tool or end effector. Also for example, some robots have a static base, while other robots are mobile (e.g., autonomous vehicles, robotic vacuums.) As a further example, some robots have a humanoid appearance, with a head, a body or portion thereof which may include a torso, and optionally one or more appendages (e.g., arms, legs).

A human-machine interface may be useful for allowing a human to interact with various robots. The particular form of human-machine interface may be influenced by the type of robot, the level of technical sophistication of the human who will be interacting with the robot, and/or the type of tasks to be performed by the robot.

BRIEF SUMMARY

In operation of robots or other processor-based apparatus, it may be particularly advantageous to affirmatively assess interactions by a human with a machine (e.g., robot) to determine an intent of the human, for example to determine a meaning of responses to a query. For example, robot may present one or more queries to a human, and capture interactions by the human as responses to the one or more queries in one or more forms of response (e.g., audio response, visual response). A processor-based system may analyze the responses, and determine whether an intent of the human or intended meaning of the responses can be determined, for instance with at least a threshold level of certainty. In some implementations, the machine (e.g., robot) may query the human to confirm that the determined intention is correct. The system may store the determined response or an indication of the determined response, optionally with evidence of the responses or confirmation of the inferred intended meaning of the responses. The stored determined response or an indication of the determined response, optionally with evidence of the responses or confirmation of the inferred intended meaning of the responses may, for example, be stored in an untamperable or tamper-evident form.

In at least one implementation, a method is performed by a processor-based system, to acquire an assent or dissent of a human in response to a query. The query may be made through a processor-based humanoid robot. An example of method may be summarized as follows:

The robot delivers a query to a human user through a synthetic voice, recorded human voice, text display, or live human voice presented via the robot. The robot receives, and optionally records, audio and video data of the user while they respond.

A system may process the audio data. For example, the system may parse the audio data with a speech-to-text system and analyzing the text and audio for indications of agreement of disagreement. Examples of indications include checking for a presence of words of agreement or disagreement such as "yes", "no", "absolutely", "yep", "nah", "oui", etc.

The system may extract a tone of the user and compare to tones of agreement and disagreement collected from previous interactions.

The system may processes video data. For example, the system may extract positions of the body, head, arms, hands and/or eyes of the human who is responding. The system may compare the positions to previous collected positions or gestures that indicate assent, such as a head nod and a thumbs up, or dissent, such as a head-shake or walking away from the robot.

If the audio and video responses are consistent (positive or negative) the system may store a full response associated with the query.

If one of the audio or video responses are is inconclusive, the system may store a partial response associated with the query.

If the audio and video responses are inconclusive or inconsistent with one another, the determined intended response is set to inconclusive. The system may optionally store inconclusive responses associated with the query.

The robot may optionally query the human to confirm that the determined intended response is actual or correct response intended by the human. The response to confirmation request can be processed in a similar fashion to processing of the response to the initial request.

The robot optionally stores the video data, audio data, or processed data (e.g., determined intended response, response to confirmation query) to allow a human to review the response at a later date. The term "collect" includes storing data either locally or non-locally. The term "process" refers to executing processor-executable instructions, providing input processor-readable data, and in response to execution creating output processor-readable data

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with robots, servers, communications networks or other communications channels, and various sensors or transducers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the various implementations or embodiments.

Figure 1:
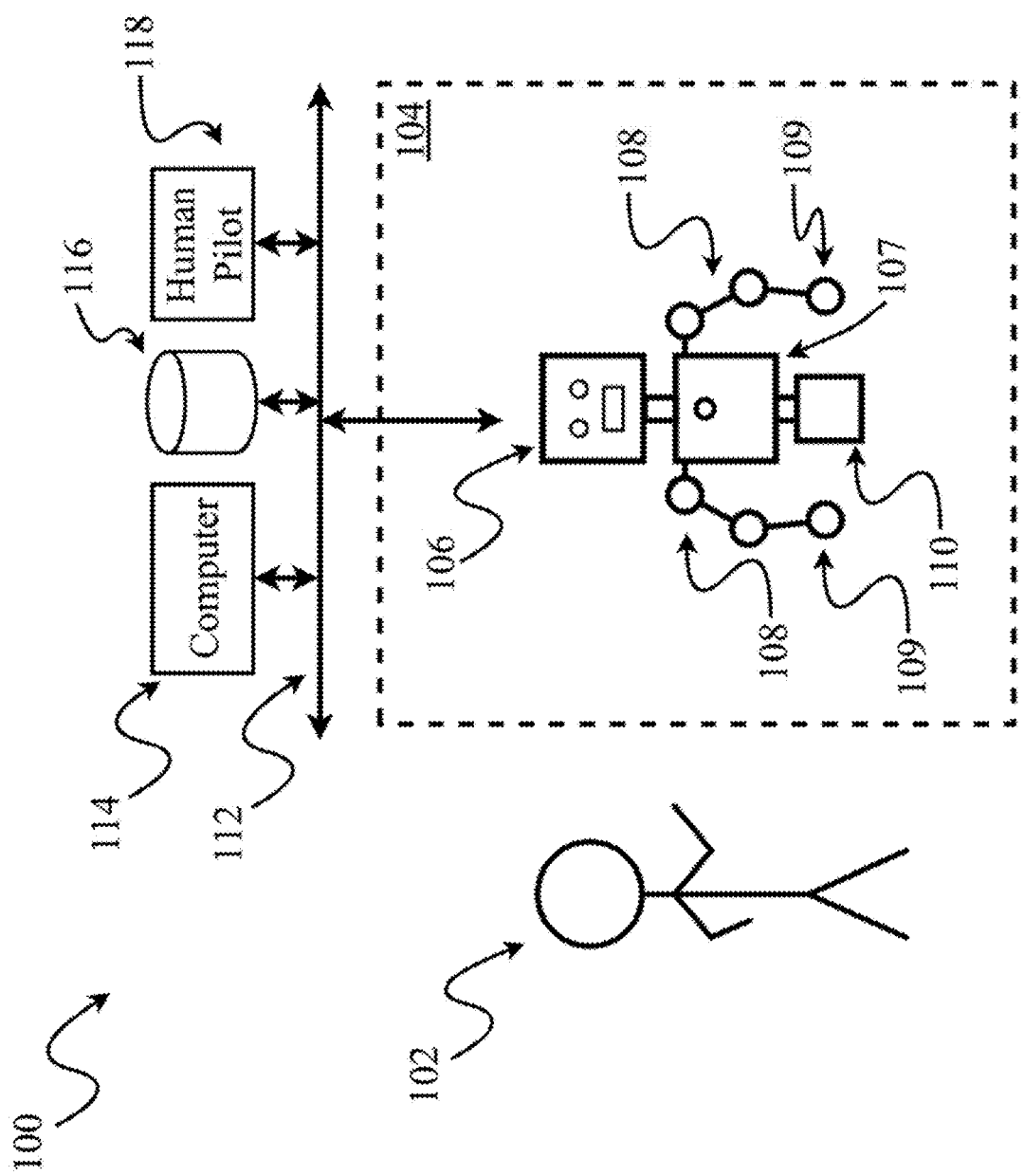
FIG. 1 is a schematic diagram of a system including a robot having a humanoid appearance and a human interacting with the robot, according to at least one illustrated implementation.

FIG. 1 shows a processor-based system 100 according to at least one illustrated implementation, which can perform various acts described herein. A human user 102 interacts with a robot, for example a humanoid robot 104, for instance, by responding to queries.

The humanoid robot 104 can have various implementations or forms, and resembles at least a portion of a human, for example including a humanoid head 106. In some implementations, humanoid head 106 includes features that resemble a pair of eyes, features that resemble a mouth, and optionally other human-like features. Humanoid head 106 is optionally coupled to a robotic torso 107. In some implementations, two robotic appendages (e.g., robotic actuated arms 108) are moveable coupled to the robotic torso 107. Each of the robotic actuated arms 108 include at least two links, the links coupled together with one or more joints. The joints of the robotic actuated arms 108 may be actuated or passive and may couple the included links in series. Each of the arms 108 may include a respective end-effector 109. In the illustrated implementation, the humanoid robot 104 includes a base unit 110 coupled to torso 107. In other implementations, the humanoid robot 104 may include one or more leg appendages that resemble human legs (e.g., humanoid legs), wheels, treads, etc. Further details of and alternatives to humanoid robot 104 are further described with reference to FIG. 2.

Referring to the example system 100 in FIG. 1, the humanoid robot 104 is communicatively coupled through a wired and/or wireless communications channel to a network 112. The network 112 communicatively couples humanoid robot 104 with other processor-based systems for example computers 114, with network accessible storage media 116, and/or with a human operator or pilot 118. Network 112 may also communicatively couple the humanoid robot 104 via the Internet, or an intranet or extranet. Computer 114 may include one or more processors, for example one or more microprocessors, central processing units (CPUs), graphics processing units (GPUs), digital signal processors (DSPs), field programmable gate arrays (FPGAs), programmable logic controllers (PLCs), operable to execute instructions or logic to carry one the methods or portions thereof described herein. Computer 114 may include one or more non-transitory processor-readable storage media that stores processor-executable instructions, logic and/or data, for example one or more volatile memories (e.g., random access memory (RAM), registers); nonvolatile memory (e.g., read only memory (ROM), Flash memory, electronically erasable programmable read only memory (EEPROM), solid state drive (SSD)); or spinning media storage (e.g., magnetic disk, optical disk) with associated drive (e.g., hard disk drive, optical disk drive, tape storage). Processor-executable instructions, logic and/or data may be stored as software (e.g., executable object code), firmware or other forms. Computer 114 may include one or more buses or other communications channel communicatively coupling the processor(s) and storage media.

FIG. 1 is an example of a system which can execute various methods described herein. The human user 102 interacts with humanoid robot 104. The humanoid robot 104, in response to executing processor-executable instructions, presents a query to human user 102. When human user 102 replies to the query with a response, the humanoid robot 104 or another processor-based system (e.g., computer 114), by executing processor-executable instructions, analyzes the response and determines one or more aspects present in or characteristics of the response offered by human user 102, for example to determine or infer an intended response based at least in part on the determined aspects or characteristics, and/or to confirm that the determined or inferred response is correct response intended by the human user 102. Further details of this method described herein.

Figure 2:
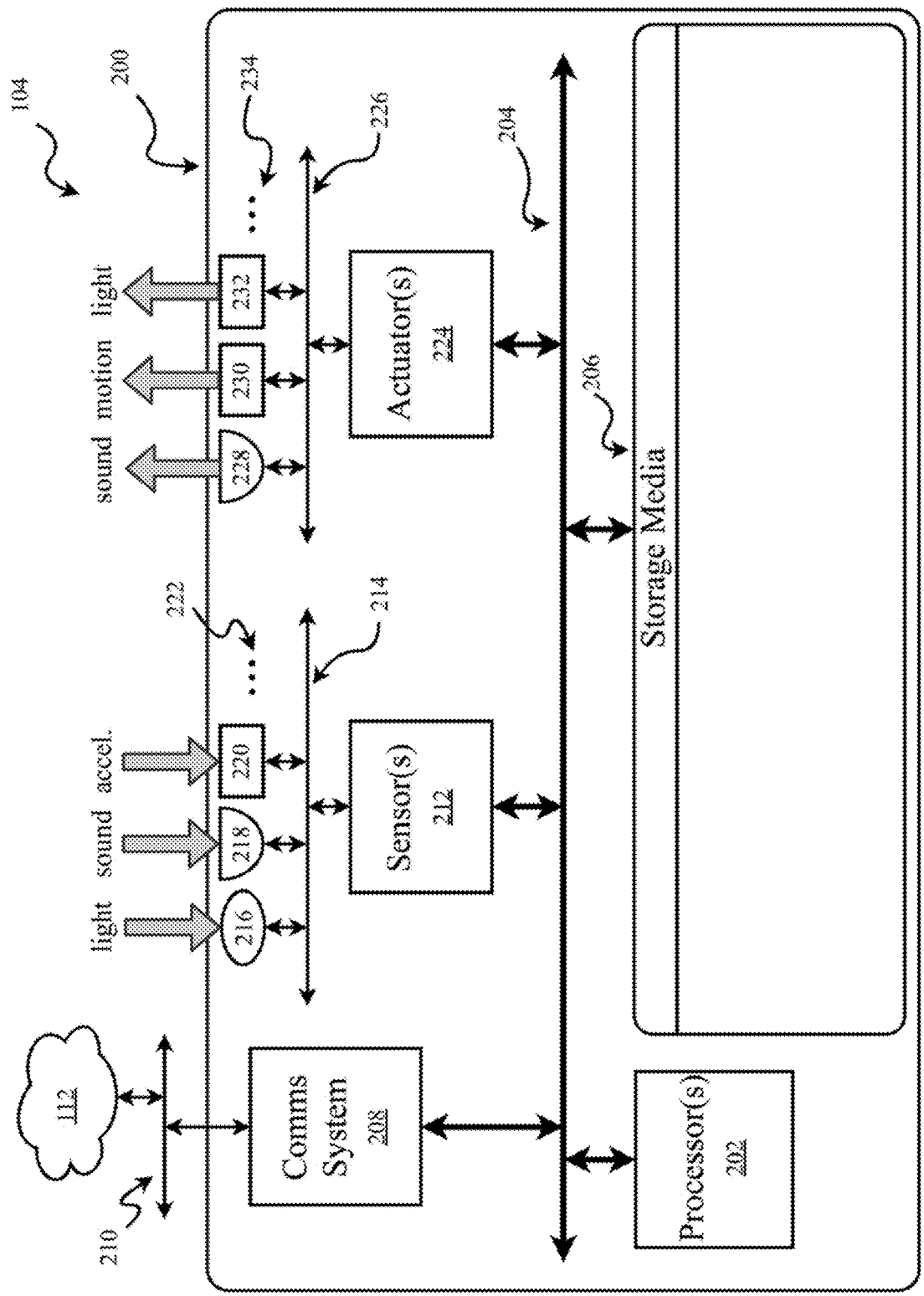
FIG. 2 is a block diagram of a system, according to at least one illustrated implementation.

FIG. 2 schematically illustrates a robot system 200 which may be used as humanoid robot 104. One more components in robot system 200 may be included in humanoid robot 104, and may be used in execution of implementations of one or more methods described herein. Many of the components illustrated or described herein can be broken up into parts, combined into other structures, or replaced by other components.

Robot system 200 includes a processing subsystem including one or more digital processors 202 and associated circuitry. Digital processors 202 include circuitry and may be any logic processing unit, such as one or more microprocessors, central processing units (CPUs), digital signal processors (DSPs), graphics processing units (GPUs), application-specific integrated circuits (ASICs), programmable gate arrays (PGAs), and programmed logic controller (PLCs).

The processor(s) 202 is(are) coupled to a data bus 204 allowing interaction between the various components of robot system 200. The data bus 204 can be implemented using a variety of wired or wireless structures and associated data exchange protocols, such as USB, PCIe, SATA, NVMe, and I2C. The data bus 204 couples processor(s) 202 to a one or more digital storage devices 206 which may include a combination of hard disk drives, solid state drives, flash storage devices, tape storage, random access memory (RAM), read only memory (ROM), registers, or other digital data storage systems. The digital storage device 206 houses, at least, data storage, one or more sets of processor-executable instructions that may be executed by processor(s) 202, interface drivers for the other systems. The data bus 204 is coupled to a communication system or controller 208 which allows access and control of a communication bus 210. Bus or communications port (e.g., wired port, wireless port or radio, optical fiber port) 210 communicatively couples one or more components of system 200 to a network like network 112, other wired or wireless structures, and employs interface protocols which allow system 200 to perform digital data interaction with other devices.

Sensor(s) interface 212 is communicatively coupled to data bus 204 and a sensor bus 214. One or more sensors may be coupled to sensor bus 214 such as one or more image sensors 216 (e.g., digital camera, Videocon, photodiodes), one or more microphones 218, one or more acceleration sensors (single axis or multi-axis accelerometers, inertial sensors) 220, magnetic sensors, or other sensors 222. Various sensors may be located in a portion of the humanoid robot 104. For example, cameras may be positioned at or proximate the eyes, speakers positioned at or proximate the mouth, microphones positioned at or proximate the ears.

Actuator(s) interface 224 communicatively couples data bus 204 and actuator bus 226. One or more components in system 200 may interact with one or more actuators by actuator(s) interface 224. System 200 can include a variety of different types of Actuator(s) interfaces 224, for example motor controllers or microcontrollers operable to control electric motors, solenoids, electromechanical relays, valves, etc. System 200 can include a variety of different types of actuators such as one or more speakers 228, one or more force actuators 230 (e.g., electric motor, stepper motor, solenoid, pneumatic piston with piston head, piston cylinder, valves and reservoir of pressurized fluid (e.g. gas), hydraulic piston with piston head, piston cylinder, valves and reservoir of pressurized fluid (e.g. relatively incompressible liquid), magnets, haptic engines), one or more light emitting devices (such as liquid crystal display screens (LCDs), light emitting diodes (LEDs) or LED screens, etc.) 232, or other actuators 234. Various actuators may be located in a portion of the humanoid robot 104. For example, motors, solenoids or pistons can be located at or proximate joints or linkages of various appendages.

Figure 3:
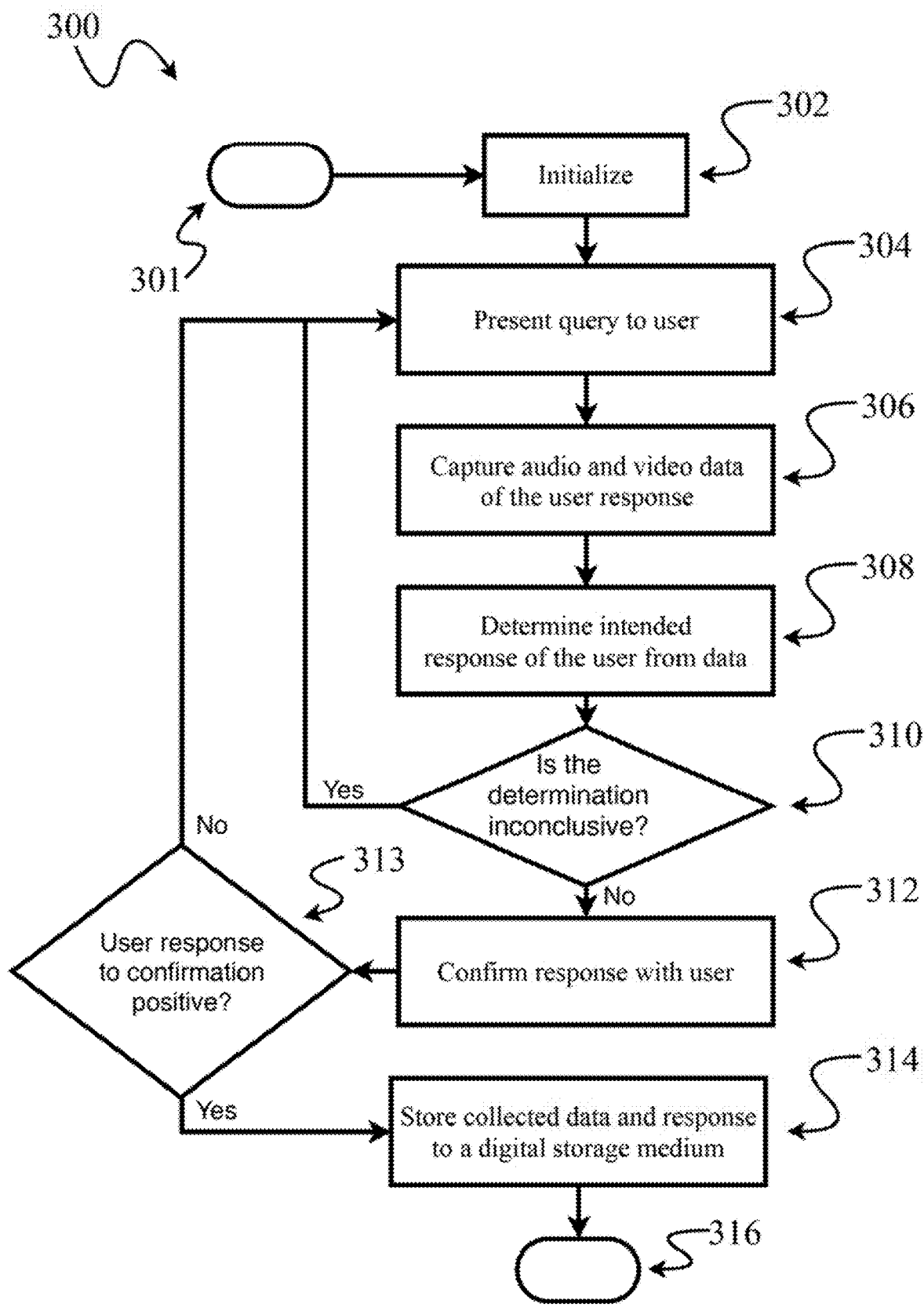
FIG. 3 is a flow diagram of a high level method executable by the system of FIG. 1 or 2 to implement a human-machine interface, according to at least one illustrated implementation.

FIG. 3 shows an overall method 300 performed by a controller, such as circuitry or at least one hardware processor, for operation in a robotic system such as humanoid robot 104, according to at least one illustrated implementation. Overall method 300, in part, is an example of how a robotic system may determine an intended response from human user 102 to a query presented by humanoid robot 104.

The overall method 300, and other methods described herein, may be varied to include other acts, omit acts, and/or vary acts, or perform acts in a different order to accommodate alternative implementations. Overall method 300 is described as being performed by a controller, for example, processor(s) in processing subsystem 202, in conjunction with other components, such as those found in, system 100, and robot system 200. The controller in this and other methods is referred to as singular but may be performed by multiple controllers. In overall method 300 and other methods a controller may be described as performing an act and this includes performing the act or causing the act to be performed. The controller performs overall method 300 in response to executing processor-executable instructions or other logic.

At 301, the overall method 300 starts. For example, the overall method 300 may start in response to a startup of the system, detection of a human or approach of a human, a user input, a call or invocation from a calling routine or program.

At 302, the controller initializes one or more components. At 304, the controller causes humanoid robot 104 to presents a query to a user (e.g., human user 102). Then, at 306, the controller causes the humanoid robot 104 to capture audio and video of the user as the user responds to the query. The captured audio and video are processor-readable data. At 308, the controller analyzes the captured audio and video to determine or infer the response intended by the user from audio and video data. This may comprise comparing verbal responses, tonal responses, gestural responses, or a variety of other responses in a binary fashion or using assigned weights to give some types of responses more weight than other types of responses (e.g., a response such as the term "yes" or "no" may be given more weight than a response such as a head, facial or arm gesture). At 310, the controller determines whether the intended or inferred response is inconclusive. If the controller determines that the intended or inferred response is inconclusive, the controller causes humanoid robot 104 to redeliver the query at 304. If the controller determines that the intended or inferred response is conclusive, the controller optionally causes the humanoid robot 104 to request a confirmation from the user that the determined response is correct at 312.

At 313, the controller determines whether the user has confirmed that the intended or inferred response is correct. If the determined intended or inferred response is not confirmed by the user, the controller causes humanoid robot 104 to redeliver the query at 304. If the determined intended or inferred response is confirmed by the user, the controller at 314 stores data collected, generated, or processed so far in the execution of method 300 in a storage device like digital storage device 206.

The overall method 300 may terminate at 316 until invoked again. Alternatively, the overall method 300 may continually or periodically repeat while the system is operational.

Figure 4:
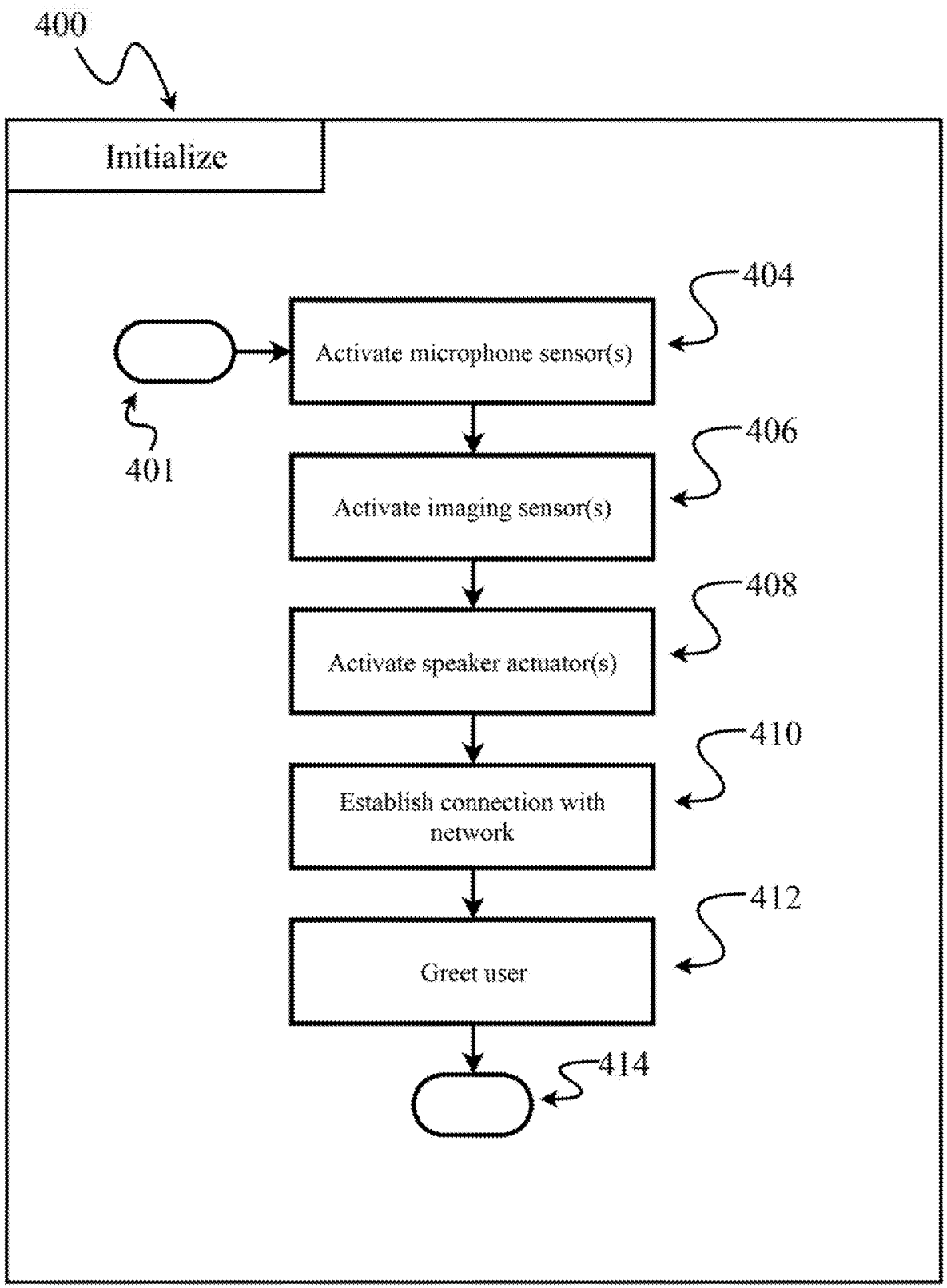
FIG. 4 is a flow diagram of an initialization method executable by the system of FIG. 1 or 2 in performing the method of FIG. 3, according to at least one illustrated implementation.

FIG. 4 shows an initialization method 400, according to at least one illustrated implementation. A controller may perform the initialization method 400 when controller initializes one or more components of a system and/or humanoid robot 104. The initialization method 400 may be performed as part of executing the overall method 300 (FIG. 3).

Initialization method 400, in part, prepares the humanoid robot 104 for interaction (e.g., social interaction, conversation) with a human. Method 400 may implement all or a portion of the initialization 302 of method 300 (FIG. 3). Various acts of method 400 are optional, and may be performed in a different order than presented. Initialization method 400 starts at 401. For example, the initialization method 400 may start in response to a startup of the system, detection of a human or approach of a human, a user input, a call or invocation from a calling routine or program, or completion of a previous inquiry and response cycle.

At 404, the controller activates at least one microphone such as microphones 218. Activating the microphone may, for example, include monitoring the microphone for detection of sound, for instance specific sounds (e.g., talking, commands, a name or other keyword or key phrase). At 406, the controller activates one or more imaging sensors or causes one or image sensor(s) to be activated. Examples of imaging sensor(s) are shown in FIG. 2. Activating the image sensors may, for example, include monitoring images captured by the image sensors for the presence of an object (e.g., a human) or movement or motion. At 408, the controller activates, or causes activation of, one or more speakers. Activating the speakers may, for example, include applying drive signals to cause the speakers to emit sound Activating may, for example, include switching sensors or transducers to a standby operational mode and/or monitoring sensors and/or initializing sensors and actuator controllers. Acts 404, 406, 408 can be done in any order including multiple repetition of any act or acts.

At 410, the controller establishes a communicative coupling to an external controller such as a human operator or pilot 118 or other computers 114 through the network 112. The communicative coupling is to ensure that any updates to the set of instructions can be retrieved from the network and data collected can be shared to the network. The communicative coupling may also be used to retrieve queries, or receive overriding instructions.

At 412, the controller causes a greeting or other introductory communication to be presented or delivered to the user through the speaker(s) 228.

The initialization method 400 may terminate at 414, until invoke again.

Figure 5:
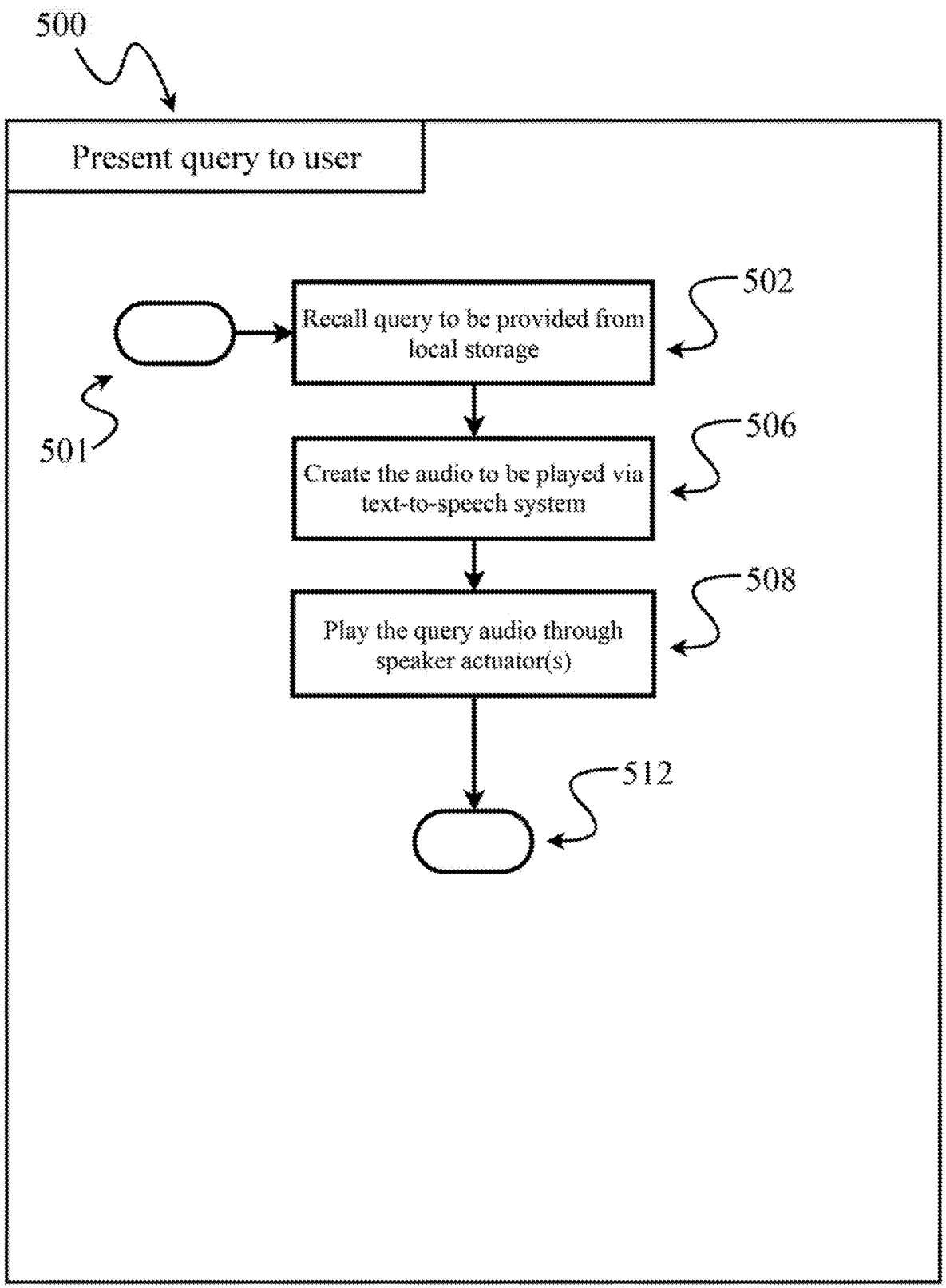
FIG. 5 is a flow diagram of a query method executable by the system of FIG. 1 or 2 in performing the method of FIG. 3 to present a query to a human, according to at least one illustrated implementation.

FIG. 5 shows a query method 500, according to at least one illustrated implementation. A controller may perform the query method 500 to cause a query to be presented to a human who is interacting with a humanoid robot 104. Method 500, in part, prepares and delivers a query through the humanoid robot 104 to the human. The query method 500 may be performed as part of executing the overall method 300 (FIG. 3).

Query method 500 may implement all or a portion of presenting a query 304 of the in overall method 300 (FIG. 3). Each act in method 500 is optional and the acts may be performed in a different order than presented.

Query method 500 begins at start node 501. For example, the query method 400 may start in response to a startup of the system, detection of a human or approach of a human, a user input, a call or invocation from a calling routine or program, or completion of an initialization.

At 502, the controller accesses a data storage medium such as digital storage device 206 and retrieves a query to be presented to the user. The query is stored as text in this implementation, but could alternatively or additionally be stored as audio recordings or video recordings.

At 506, the controller transforms the query text transforms the text into human legible speech, for example via a subroutine. The text to audio transformation process is often called a text-to-speech program. The controller may transform the text to speech by using a dictionary to translates words to their phonetic form and combining stored audio recordings of every phoneme to create the audio recording containing the speech to be delivered. The output of the text-to-speech program is an audio recording of the input text in its verbal form.

At 508, the controller routes the audio recording created at 506 to the Actuator(s) interface 224 to be played through speaker(s) 508.

The query method 500 may terminate at 512, until invoked again.

Figure 6:
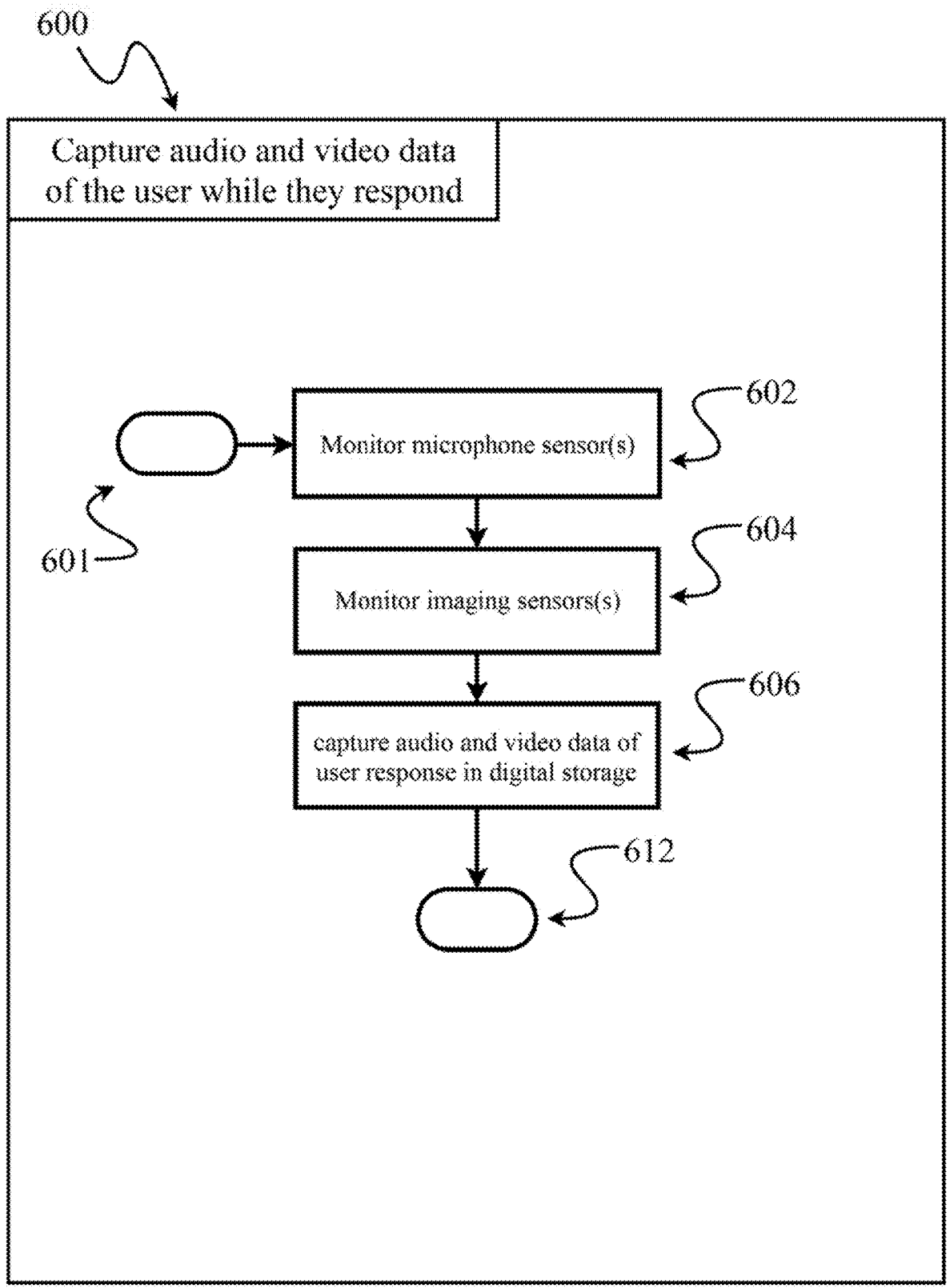
FIG. 6 is a flow diagram of a capture method executable by the system of FIG. 1 or 2 in performing the method of FIG. 3 to capture responses to a query, according to at least one illustrated implementation.

FIG. 6 shows a capture method 600, according to at least one illustrated implementations. A controller may capture audio and video data representative of a response of a human to a query presented via the humanoid robot 104. The capture method 600 may be performed as part of executing the overall method 300 (FIG. 3).

Capture method 600 may implement all or part of the capture 306 of method 300 (FIG. 3). Various acts of method 600 are optional, and acts may be performed in a different order than presented.

Capture method 600 begins at start node 601. For example, the capture method 600 may start in response to a startup of the system, detection of a human or approach of a human, a user input, a call or invocation from a calling routine or program, or completion of a presentation of a query.

At 602, the controller monitors the data output of the one or more microphones 218.

At 604, the controller monitors the data output of the one or more imaging sensors 216.

At 606, the controller captures the audio data output from the one or more microphones 218 and the video data output from the one or more imaging sensors 216. The controller continues the data capture 606 until a criteria is met. This criteria can be a simple time limit, such as "collect response data for 7 seconds" or it could be waiting for a subroutine monitoring the data to detect an end to the response.

The capture method 600 may terminate at 612, until invoked again.

Figure 7:
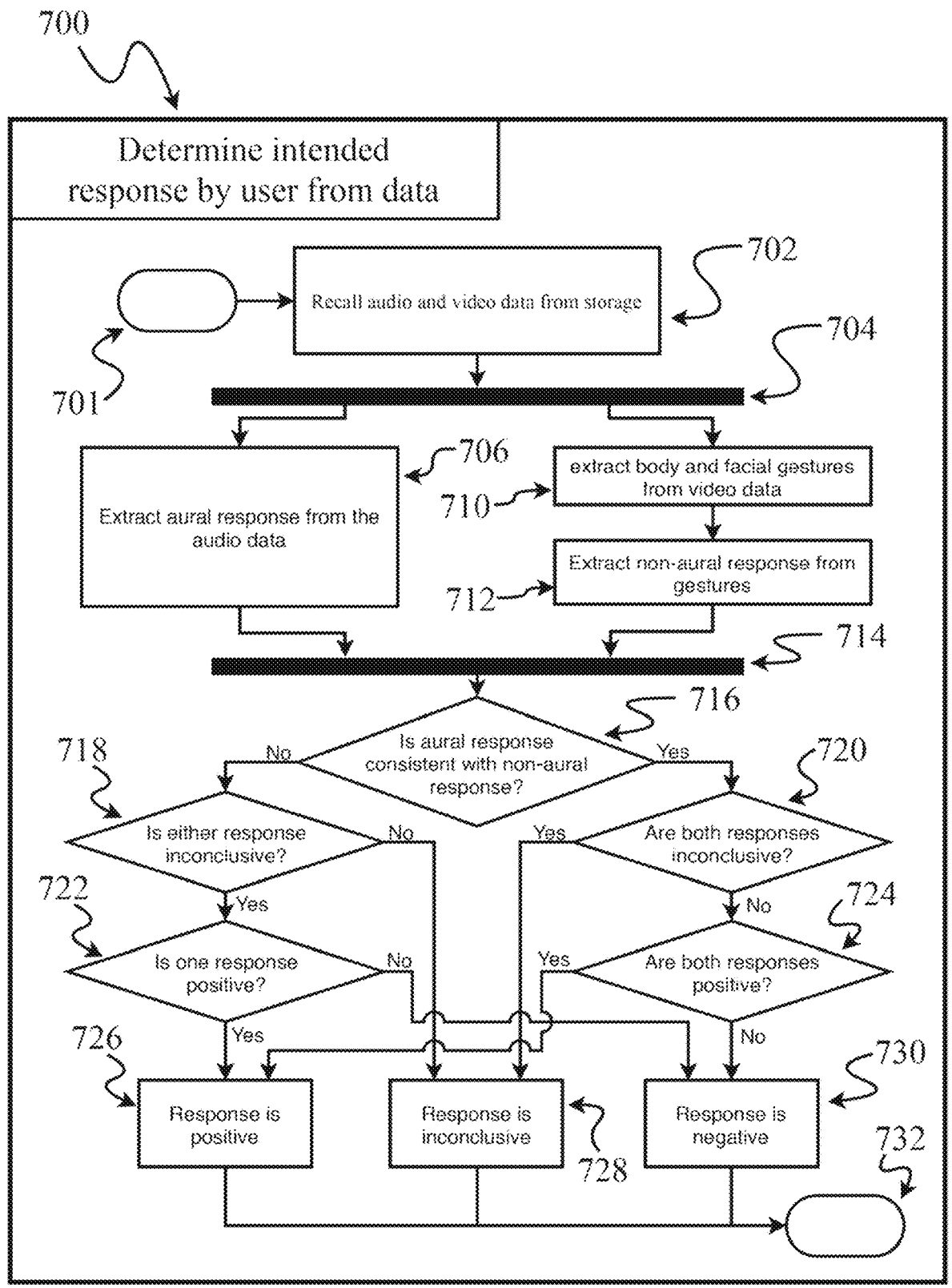
FIG. 7 is a flow diagram of an assessment method executable by the system of FIG. 1 or 2 in performing the method of FIG. 3 to determine an intended response from the captured responses, according to at least one illustrated implementation.

FIG. 7 shows an analysis method 700, according to at least one illustrated embodiment. A controller may analyze the captured audio and video data to determine or infer an intended response from human user 102 to a query presented by humanoid robot 104. In particular, the controller performing analysis method 700 may determine or infer an intended response from audio data and video data that represent a response by the human 102 to the query. The analysis method 700 may be performed as part of executing the overall method 300 (FIG. 3).

Analysis method 700 may implement all or part of the analysis 308 of method 300 (FIG. 3). Various acts of analysis method 700 are optional, and the acts may be performed in a different order than presented.

The analysis method 700 starts at 701. For example, the analysis method 700 may start in response to a startup of the system, detection of a human or approach of a human, a user input, a call or invocation from a calling routine or program, or completion of a presentation of a query.

At 702, the controller receives audio data and/or video data, or accesses a storage device storing audio data and/or video data. The audio data and/or video data represents a received or detected response of the human 102 to a query.

At 704, the controller processes the audio data and/or video data, for example processing the video data concurrently or in parallel with processing of the audio data. In some implementations the controller processes the audio data and video data in parallel together. In some implementations the controller processes the audio data and video data in parallel and separately. Alternatively, the controller may process the audio data and video data sequentially or in series.

At 706, the controller extracts an aural response from the audio data. Possible aural response extraction methods include the controller extracting words from the audio and detecting words that indicate positive and negative responses. In another aural response extraction method the controller extracts the tone of the user and detecting tones of voice that indicate positive or negative responses. The controller may use a variety of aural response extraction methods or techniques either alone or in combination to extract an aural response. The aural response can be classified as a positive response, a negative response, or an inconclusive response. An inconclusive response indicates either a lack of response or the inability of the controller to determine or classify the response as being either a positive response or a negative response.

At 710, the controller extracts the movements, gestures, or facial expressions from the video data. The controller may extract this data by using a trained machine learning program for detecting human limb movement or facial structures and landmark positions. The data extracted may include position of limbs and digits over time, movement, position or orientation of a head, movement, position or orientation of eyes, or the position of facial landmarks over time. At 712, the controller extracts the non-aural response from the movements, gestures, or facial expression data using commercial or freely available methods and programs. The non-aural response can be a positive response, a negative response, or an inconclusive response. An inconclusive response indicates either a lack of response or the inability of the controller to determine or classify the response as being either a positive response or a negative response.

At 714, the controller continues analysis method 700 in series. The controller performs one or more comparisons (e.g., 716 to 724, even numbers comparing the aural and non-aural responses to determine an intended response of the user from amongst a plurality of possible intended responses (e.g., positive 726, inconclusive 728, negative 739).

At 716, the controller determines whether the aural response is consistent with the non-aural response. For example, the controller may determine whether the aural response and the non-aural response are both positive responses, are both negative responses, or optionally are both inconclusive responses. The controller may additionally or alternatively determine whether two or more aural response characteristics (e.g., semantics, tone) are consistent with one another. For example, the controller may determine if the meaning or semantics of a response is consistent with a tone of voice of the response (e.g., both positive responses, both negative responses, optionally both inconclusive responses). The controller may additionally or alternatively determine whether two or more non-aural response characteristics are consistent with one another. For example, the controller may determine if a head or facial gesture of a response is consistent with hand gestures of the response (e.g., both positive responses, both negative responses, optionally both inconclusive responses).

If the received or detected responses are not consistent (e.g., aural response is positive and non-aural response is inconclusive), the controller determines whether one of the received or detected responses is inconclusive at 718. If the controller determines that there is no single inconclusive received or detected response, then one received or detected response is negative and the other response is positive, and the controller determines that the intended response is inconclusive 728.

Returning to 718, if the controller determines that one response is inconclusive, the controller determines whether one of the responses is positive at 722. If there is a positive response, then one response is inconclusive and the other positive, and the controller determines that the intended response is positive 726. If at 722 there is no positive response, then one response is inconclusive and the other positive, and the controller determines that the intended response is negative 730.

If at 716 the responses are consistent (e.g., aural response is positive and non-aural response is positive), the controller determines whether both the received or detected responses are inconclusive at act 720. If at 720 both responses are determined to be inconclusive, then the controller determines that the intended response is inconclusive 728. If at 720 the controller determines that both responses are not inconclusive, the controller determines whether both of the responses are positive at 724. If at act 724 both responses are determined to be positive, then the controller determines that the intended response is positive 726. If at 724 both responses are determined to be not positive, then both responses are negative and the controller determines that the intended response is negative 730.

Once the controller has determined the intended response, method 700 terminates at 732. Method 700 may be invoked again for the same data or other data.

Figure 8:
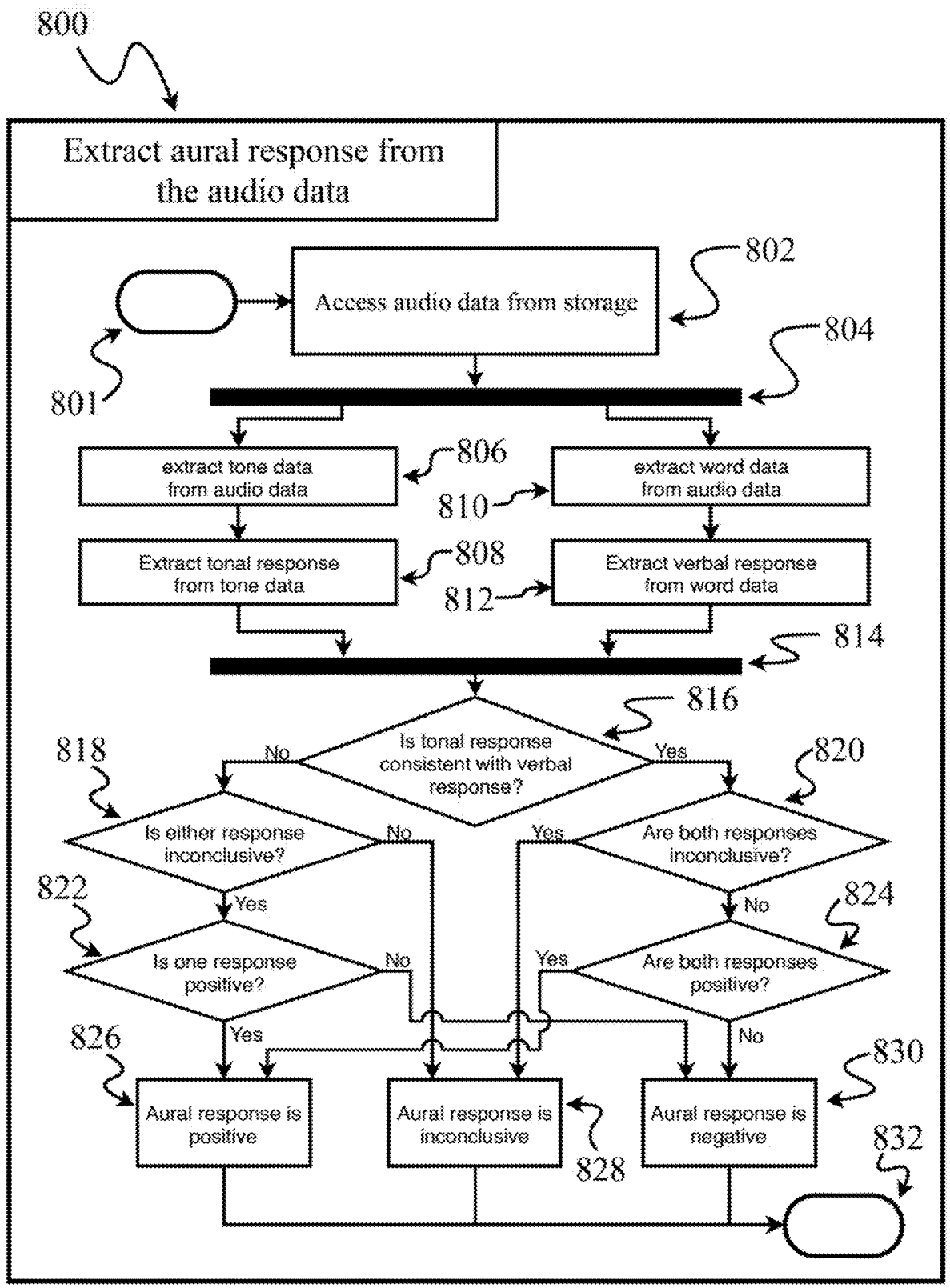
FIG. 8 is a flow diagram of an aural response assessment method executable by the system of FIG. 1 or 2 in performing the method of FIG. 3 to extract and assess oral responses to queries, according to at least one illustrated implementation.

FIG. 8 shows an aural response extraction method 800, according to at least one illustrated embodiment. A controller may determine an aural response from human user 102 to a query presented by humanoid robot 104. In particular, the controller performing aural response extraction method 800 may determine or infer an intended aural response from audio data including a response from the human user 102. Method 800 may determine the intended aural response using both the verbal content and the tonal content of the audio data. Method 800 may be part of act 706 shown in method 700.

The aural response extraction method 800 starts at 801. For example, the aural response extraction method 800 may start in response to a startup of the system, detection of a human or approach of a human, a user input, a call or invocation from a calling routine or program, or on capture or receipt of aural response data.

At 802, the controller receives audio data, or access a storage device storing audio data. The audio data represents an aural response from the human user 102.

At 804, the controller processes the tonal audio data and verbal audio data, for example in parallel. In some implementations the controller processes the tonal audio data and verbal audio data in parallel together. In some implementations the controller processes the tonal audio data and verbal audio data in parallel and separately. The controller may process the tonal audio data and verbal audio data in series.

At 806, the controller extracts the tone audio data from the audio data. The controller may extract this data by using a machine learning program trained to recognize human speech tones, intonations, etc. The data extracted may include the frequency, intonation, and other non-verbal information over time. At 808, the controller extracts the tonal response from the frequency, intonation, and other non-verbal data using commercial or freely available methods and programs. The tonal response can be positive, negative, or inconclusive. An inconclusive response indicates a lack of response or the inability of the controller to determine a response.

At 810, the controller extracts the verbal information from the audio data. The controller may extract this information by using a program that detects the presence of human language in audio recordings, often referred to as a speech recognition program, speech-to-text program, or automatic speech recognition. The method for extracting the verbal information may comprise using a machine learning program that has been trained to detect words in an audio recording. The data extracted may include words used, pronunciation, and contractions used. At 812, the controller extracts the verbal response from the verbal data using commercial or freely available methods and programs. The verbal response can be positive, negative, or inconclusive. An inconclusive response indicates a lack of response or the inability of the controller to determine a response.

At 814, the controller continues method 800 in series. The controller performs one or more comparisons (e.g., 816 to 824, even numbers) comparing the tonal and verbal responses in order to determine the intended response of the user from amongst a plurality of possible intended responses (e.g., positive 826, inconclusive 828, negative 839).

At 816, the controller determines whether the tonal response is consistent with the verbal response. For example, the controller may determine whether the tonal response and the verbal or semantic response are both positive responses, are both negative responses, or optionally are both inconclusive responses. The controller may additionally or alternatively determine whether two or more tonal response characteristics are consistent with one another. For example, the controller may determine if a tone of two or more utterances is consistent with one another (e.g., both positive responses, both negative responses, optionally both inconclusive responses). The controller may additionally or alternatively determine whether two or more verbal or semantic response characteristics are consistent with one another. For example, the controller may determine whether a respective meaning of a pair of utterances are consistent with one another (e.g., both positive responses, both negative responses, optionally both inconclusive responses).

If at 816 the responses are not consistent (e.g., tonal response is positive and verbal response is inconclusive), the controller determines whether one of the responses is inconclusive at 818. If at 818 there is no inconclusive response, then one response is negative and the other positive, and the controller determines that the intended aural response is inconclusive 828. If at 818 the controller determines that one response is inconclusive, the controller determines that one of the responses is positive at 822. If at 822 there is a positive response, then one response is inconclusive and the other positive, and the controller determines that the intended aural response is positive 826. If at 822 there is no positive response, then one response is inconclusive and the other positive, and the controller determines that the intended aural response is negative 830.

If at 816 the responses are consistent (e.g., tonal response is positive and verbal response is positive), the controller determines whether both the responses are inconclusive at 820. If at 820 both responses are inconclusive, then the controller determines that the intended aural response is inconclusive 828. If at 820 the controller determines that both responses are not inconclusive, the controller determines whether both of the responses are positive at 824. If at act 824 both responses are positive, then the controller determines that the intended aural response is positive 826. If at 824 both responses are not positive, then both responses are negative and the controller determines that the intended aural response is negative 830.

Once the controller has determined the aural response, aural response extraction method 800 terminates at 832, for example until invoked again.

Figure 9:
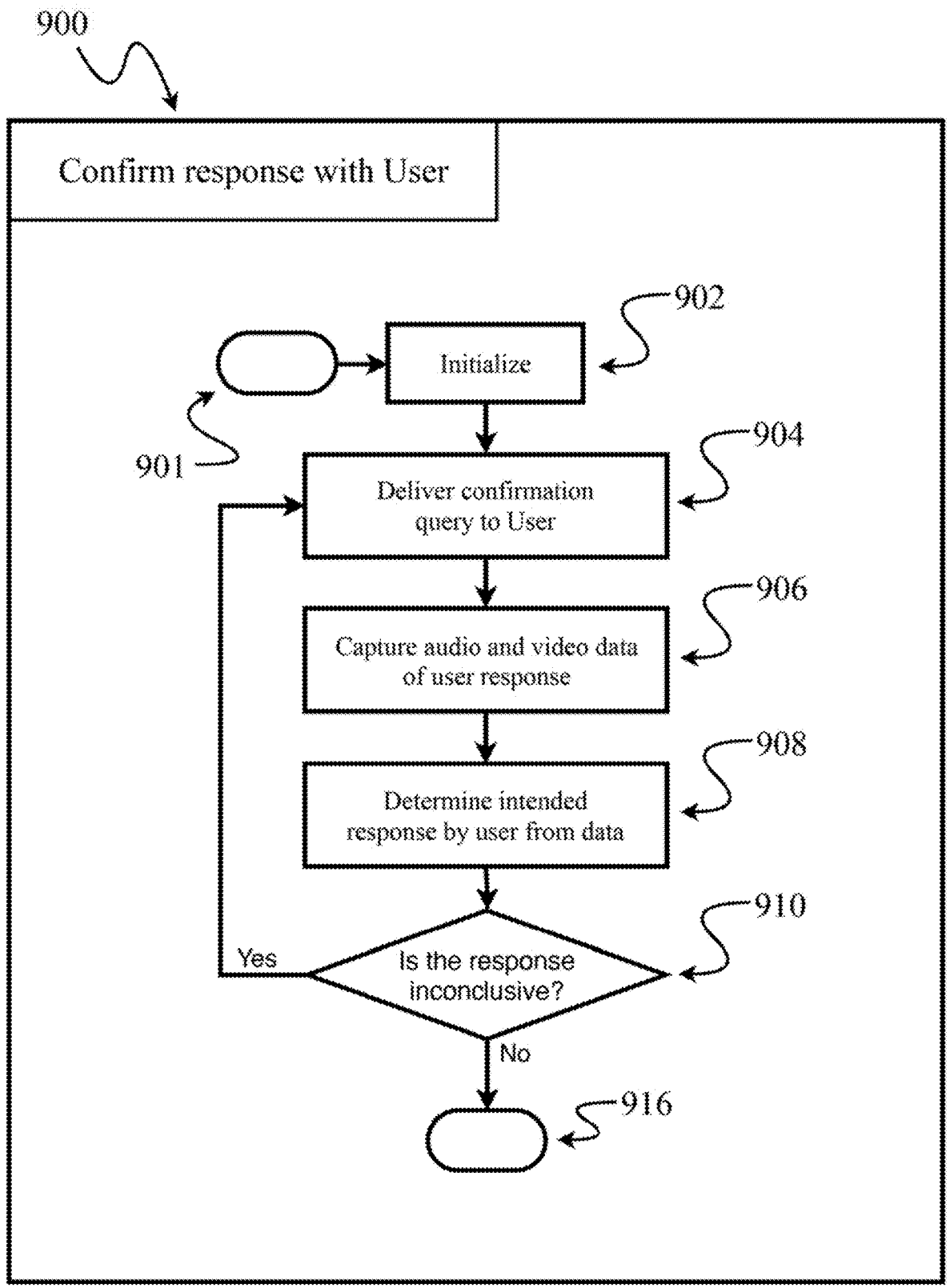
FIG. 9 is a flow diagram of a confirmation method executable by the system of FIG. 1 or 2 in performing the method of FIG. 3 to confirm that an inferred response was the intended response, according to at least one illustrated implementation.

FIG. 9 shows a confirmation method 900, according to at least one illustrated embodiment. A controller may perform the confirmation method 900 to confirm with a user that a determined intended response is correct. Confirmation method 900, may in part, prepare and cause delivery of a confirmation query through the humanoid robot 104 to a human such that the human can indicate whether or not the determined intended response is correct (i.e., their intended response). Confirmation method 900 may be performed as part of executing the overall method 300 (e.g., confirm response with user 312). Various acts of the confirmation method 900 are optional and/or the acts may be performed in a different order than presented.

The implementation of the confirmation method 900 presented in FIG. 9 is very similar to method 300 as a whole, and follows the same progression with the exception of acts 312, 313, and 314.

The confirmation method 900 starts at 901. For example, the confirmation method 900 may start in response to a startup of the system, detection of a human or approach of a human, a user input, a call or invocation from a calling routine or program, or completion of a determination of an intended response.

At 902, the controller initializes one or more components. 902 may be implemented to comprise method At 904, the controller causes humanoid robot 104 to presents a confirmation query to a user (e.g., human user 102). The confirmation query presented is a request of the human user for confirmation that the determined intended response is correct. 902 may be implemented to comprise method 500 (FIG. 5). At 906, the controller causes the humanoid robot 104 to capture audio and video of the user as the user responds to the query. The captured audio and video are processor-readable data. 906 may be implemented to comprise method 600 (FIG. 6). At 908, the controller determines the user's intended response from audio and video data. 908 may be implemented to comprise method 700 (FIG. 7). At 910, The controller determines whether the received or captured response is inconclusive. If inconclusive, the controller causes humanoid robot 104 to redeliver the confirmation query at 904. Otherwise, method 900 terminates at node 916 until invoked again.

Figure 10:
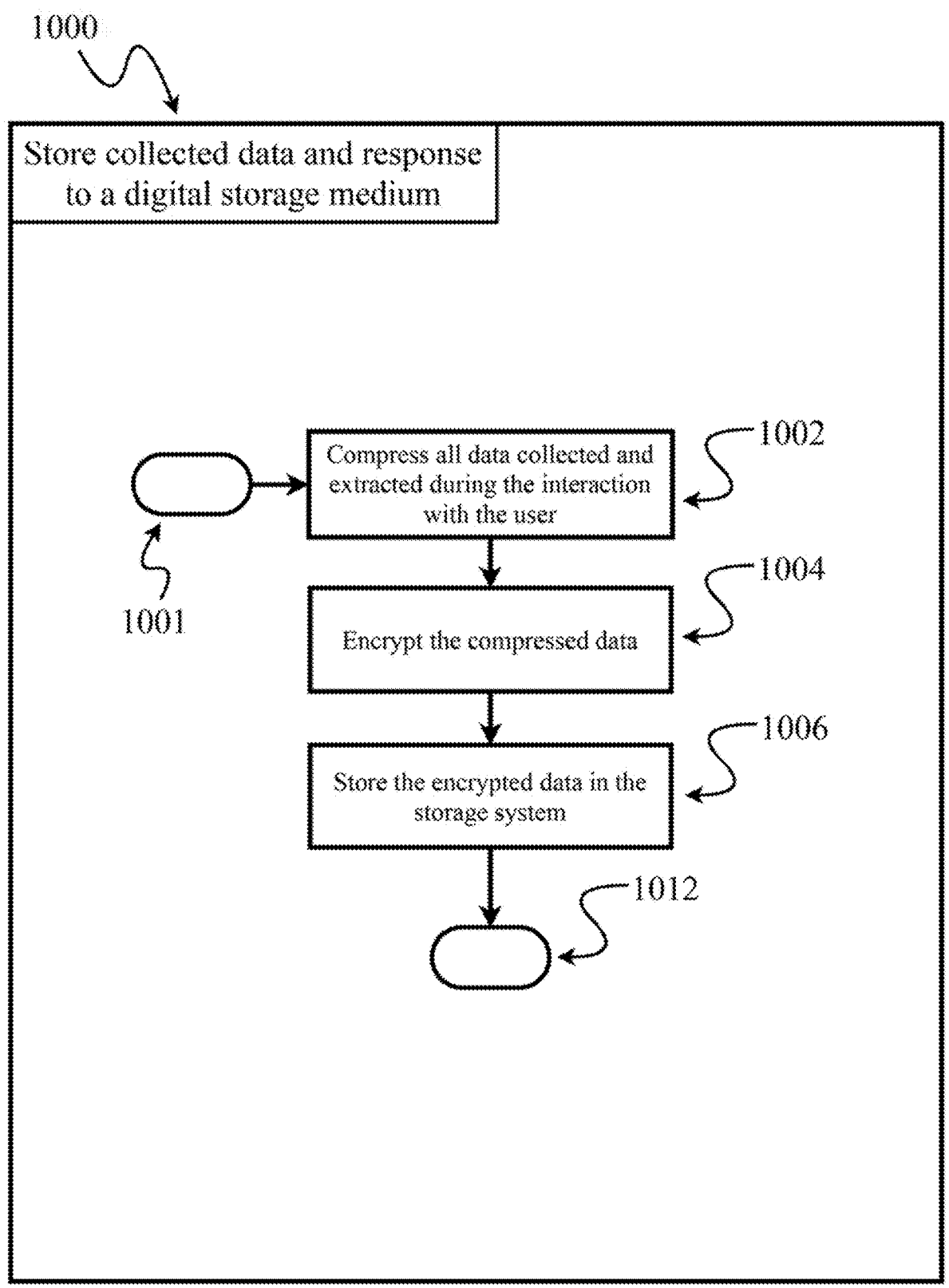
FIG. 10 is a flow diagram of a storage method executable by the system of FIG. 1 or 2 in performing the method of FIG. 3 to store responses and optionally evidence of the same, according to at least one illustrated implementation.

FIG. 10 shows a storage method 1000, according to at least one illustrated embodiment. A controller may perform the storage method 1000 to store collected data to a non-transitory digital storage medium. The storage method 1000, may in part, collect all the data that was collected during the interaction between the humanoid robot 104 and a human user. Storage method 1000 may be executed as part of performing the overall method 300 (e.g., store collected data 314). Various acts of the storage method 1000 are optional, and/or the acts may be performed in a different order than presented.

Storage method 1000 starts at 1001. For example, the storage method 1000 may start in response to a startup of the system, detection of a human or approach of a human, a user input, a call or invocation from a calling routine or program, or completion of a determination or confirmation of an intended response.

At 1002, the controller compresses some or all the data collected during the query and response methods, including the video and audio data, the determined response, the confirmation response, the extracted response data, logs of processes and other digital information collected or created during method 300. The compression could be lossless or lossy and may be done in any of many ways known to those having skill in the art. At 1004, the controller encrypts the compressed data using a cryptographic algorithm such as AED, RSA, SHA, or other methods for encrypting data. at 1006, the controller stores the encrypted data into a data storage such as digital storage device 206. The controller may also send some or all the data for further storage elsewhere through network 112. Until invoked again, method 1000 ends at end node 1012.

The content of U.S. patent application 62/873,093, filed Jul. 11, 2019, are hereby incorporated herein in its entirety.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments.

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A method of operation in a processor-based system to facilitate machine-human interaction between a user and the processor-based system, the method comprising:
   accessing, by at least one processor of the processor-based system, a first captured response to a first user query;
   accessing, by at least one processor of the processor-based system, a second captured response to the first user query;
   extracting, by at least one processor of the processor-based system, a first aural response from the first captured response;
   extracting, by at least one processor of the processor-based system, a second aural response from the first captured response;
   determining, by at least one processor of the processor-based system, an intended aural response based on the first aural response and the second aural response;
   extracting, by at least one processor of the processor-based system, one or more non-aural responses from the second captured response, wherein extracting the one or more non-aural responses comprises applying the second captured response to an input of a first trained machine learning model trained to extract the one or more non-aural responses from the second captured response;

determining, by at least one processor of the processor-based system, an intended non-aural response based on the one or more non-aural responses;

determining, by at least one processor of the processor-based system, a value of a first consistency parameter for the intended aural response;

determining, by at least one processor of the processor-based system, a value of the first consistency parameter for the intended non-aural response; and in response to determining that the value of the first consistency parameter for the intended aural response is different from the value of the first consistency parameter for the intended non-aural response, generating a second user query based at least in part on the intended aural response, the intended non-aural response, and the values of the first consistency parameter.

2. The method of claim 1 wherein the first captured response comprises audio data, and wherein extracting, by at least one processor of the processor-based system, the first aural response from the first captured response comprises:
deriving a set of words from the audio data; and
determining whether the set of words includes any words that indicate a positive response to the first user query or any words that indicate a negative response to the first user query.

3. The method of claim 2 wherein extracting, by at least one processor of the processor-based system, the second aural response from the first captured response comprises:
deriving a tone of voice from the audio data; and
determining whether the tone of voice indicates a positive response to the first user query, indicates a negative response to the first user query, or indicates neither a positive nor a negative response to the first user query.

4. The method of claim 3, further comprising:
determining, by at least one processor of the processor-based system, whether the words derived from the audio data and the tone of voice derived from the audio data are consistent with one another, and storing an indicator of their consistency in a long term storage repository.

5. The method of claim 1 wherein the second captured response comprises video data, and wherein the trained machine learning model is trained to perform operations comprising:
deriving at least one gesture from the video data; and
determining whether the at least one gesture indicates a positive response to the first user query, indicates a negative response to the first user query, or indicates neither a positive nor a negative response to the first user query.

6. The method of claim 5 wherein determining whether the at least one gesture indicates a positive response to the first user query, indicates a negative response to the first user query, or indicates neither a positive nor a negative response to the first user query includes determining whether the at least one gesture appears in a defined set of key gestures.

7. The method of claim 6 wherein determining whether the at least one gesture appears in a defined set of key gestures includes determining whether the at least one gesture appears in the defined set of key gestures which includes: an extension of a thumb upwards, an upward/downward nod of a head, a left/right sweeping of a head, or a movement away of a body or head relative to a viewpoint of a number of images that comprise the video data.

8. The method of claim 7, further comprising:
determining, by at least one processor of the processor-based system, whether two or more of the gestures are consistent with one another, and storing an indicator of their consistency in a long term storage repository.

9. The method of claim 1 further comprising:
determining, by at least one processor of the processor-based system, a value of a second consistency parameter for the intended aural response; and
determining, by at least one processor of the processor-based system, a value of the second consistency parameter for the intended non-aural response.

10. The method of claim 9 further comprising:
in response to determining that the value of the second consistency parameter for the intended aural response is the same as the value of the second consistency parameter for the intended non-aural response, storing an indication of the value of the second consistency parameter along with at least a portion of the first and second captured responses in a long term storage repository.

11. The method of claim 1 further comprising:
causing a presentation of the second user query to the user.

12. The method of claim 1 wherein extracting the first aural response or extracting the second aural response from the first captured response comprises:
providing the first captured response as input to a trained neural network/reinforced learning system taught to ascertain whether a response to the first user query is a positive response or a negative response to the first user query.

13. The method of claim 1, further comprising:
generating, by at least one processor of the processor-based system, an intended response based on the intended aural response and the intended non-aural response; and
causing, by at least one processor of the processor-based system, a confirmation request to be presented to the user to confirm that the intended response determined by the at least one processor-based system matches the response to the first user query intended by the user.

14. The method of claim 1, further comprising:
providing the first and second captured responses or processed data derived therefrom for review by a human.

15. The method of claim 1, further comprising:
presenting the first user query to the user by a humanoid robot.

16. The method of claim 15, further comprising:
receiving the first captured response via one or more microphones at the humanoid robot; and
receiving the second captured response via one or more cameras at the humanoid robot.

17. The method of claim 16 determining, by at least one processor that is part of the humanoid robot, an intended response to the first user query based on the intended aural response and the intended non-aural response.

18. The method of claim 16, further comprising:
receiving, by the processor-based system, the first and second captured responses from the humanoid robot, wherein the humanoid robot is remotely located from the processor-based system.

19. A system comprising:
a robot comprising a set of sensors including one or more audio sensors and one or more image sensors;
at least one processor; and
at least one nontransitory processor-readable medium communicatively coupled to the at least one processor and that stores at processor-executable instructions which, when executed by the at least one processor, cause the at least one processor to perform operations comprising:
accessing a first captured response to a first user query, wherein the first captured response is generated from an output of the one or more audio sensors;
accessing a second captured response to the first user query, wherein the second captured response is generated from an output of the one or more image sensors;
extracting a first aural response from the first captured response;
extracting a second aural response from the first captured response;
determining an intended aural response based on the first aural response and the second aural response;
extracting one or more non-aural responses from the second captured response, wherein extracting the one or more non-aural responses comprises applying the second captured response to an input of a trained machine learning model trained to extract the one or more non-aural responses from the second captured response;
determining an intended non-aural response based on the one or more non-aural responses;
determining a value of a first consistency parameter for the intended aural response;
determining a value of the first consistency parameter for the intended non-aural response; and
in response to determining that the value of the first consistency parameter for the intended aural response is different from the value of the first consistency parameter for the intended non-aural response, generating a second user query based at least in part on the intended aural response, the intended non-aural response, and the values for the first consistency parameter.

20. The system of claim 19 wherein extracting the first aural response from the first captured response comprises:
deriving a set of words from at least one audio file that comprises at least a portion of the first captured response to the first user query;
determining whether the set of words includes any words that indicate a positive response to the first user query or any words that indicate a negative response to the first user query;
wherein extracting the second aural response from the first captured response comprises:
deriving a tone of voice from at least one audio file that comprises at least a portion of the first captured response to the first user query;
determining whether the tone of voice indicates a positive response to the first user query, indicates a negative response to the first user query, or indicates neither a positive nor a negative response to the first user query; and
wherein the operations further comprise:
determining whether the words derived from the at least one audio file and the tone of voice derived from the at least one audio file are consistent with one another, and storing an indicator of their consistency in a long term storage repository.

21. The system of claim 19 wherein the trained machine learning model is trained to:
derive at least one gesture from at least one video file that comprises at least a portion of the second captured response to the first user query; and
determine whether the at least one gesture indicates a positive response to the first user query, indicates a negative response to the first user query, or indicates neither a positive nor a negative response to the first user query.

22. The system of claim 21 wherein the trained machine learning model is further trained to:
determine whether two or more of the gestures are consistent with one another, and
store an indicator of their consistency in a long term storage repository.

23. The system of claim 19 wherein determining whether the at least one gesture indicates a positive response to the first user query, indicates a negative response to the first user query, or indicates neither a positive nor a negative response to the first user query comprises:
determining whether the at least one gesture appears in a defined set of key gestures including an extension of a thumb upwards, an upward/downward nod of a head, a left/right sweeping of a head, or a movement away of a body or head relative to a viewpoint of a number of images that comprise the video file.

\* \* \* \* \*